United States Patent [19]
Mnich et al.

[11] Patent Number: 5,807,628
[45] Date of Patent: Sep. 15, 1998

[54] METHOD OF REPAIRING SOUND ATTENUATION STRUCTURE USED FOR AIRCRAFT APPLICATIONS

[75] Inventors: Jason G. Mnich, Pismo Beach; David S. Marsh; Ralph T. Werley, both of Perris, all of Calif.

[73] Assignees: Rohr, Inc., Chula Vista, Calif.; Minnesota Mining & Manufacutring Company, St. Paul, Minn.

[21] Appl. No.: 811,256

[22] Filed: Mar. 4, 1997

Related U.S. Application Data

[62] Division of Ser. No. 509,037, Jul. 28, 1995, Pat. No. 5,653,836.

[51] Int. Cl.$^6$ .............................. B32B 3/12; B32B 5/18; B32B 7/12; B32B 35/00; C09J 7/02
[52] U.S. Cl. ..................... 428/314.2; 428/41.5; 428/63; 428/118; 428/315.7; 428/317.3; 428/317.5; 428/317.7
[58] Field of Search ............................. 423/63; 428/41.5, 428/118, 314.2, 315.7, 317.3, 317.5

[56] References Cited

U.S. PATENT DOCUMENTS 5,653,836   8/1997   Mnich et al. .............................. 156/98

Primary Examiner—James C. Cannon
Attorney, Agent, or Firm—Patrick J. Schlesinger

[57] ABSTRACT

A method and product for repairing a sound attenuation structure for aircraft jet engine noise that includes a central honeycomb core having an imperforate facing sheet adhesively bonded thereto and a perforated facing sheet adhesively bonded to the opposing surface of the core with a woven wire cloth media adhesively bonded to the outer surface of the perforated sheet. The wire cloth is subject to deterioration and disbonding in service use. The method provides for the removal of the deteriorated wire cloth that has disbanded or deteriorated and, after cleaning of the perforated sheet and the associated honeycomb core area, and priming of the cleaned area of the perforated sheet replacement with a polymer film that is precoated with a pressure sensitive adhesive so that the film may be easily applied to the exposed perforated sheet area in place of the removed wire cloth. The film is laser drilled to provide microporous pores to permit the repaired product to substantially retain its original acoustic properties. A polyurethane film that is adapted to be erosion resistant and ultraviolet radiation resistant is disclosed.

5 Claims, 1 Drawing Sheet

METHOD OF REPAIRING SOUND ATTENUATION STRUCTURE USED FOR AIRCRAFT APPLICATIONS

This is a divisional of application Ser. No. 08/509,037 filed on Jul. 28, 1995 now U.S. Pat. No. 5,653,836.

BACKGROUND OF THE INVENTION

1. Field of the Invention

This invention relates in general to the field of structural noise suppression structures particularly adapted to use in aircraft jet engine housings and, more particularly but not by way of limitation, to an improved method and product for repairing sound suppression honeycomb sandwich panels.

2. Description of the Prior Art

In attenuating noise particularly associated with an aircraft jet engine a particularly efficient panel is the honeycomb noise attenuation structure disclosed in U.S. Pat. No. 4,291,079 dated Sep. 22, 1981. The sound attenuation structure shown in this patent has been found to be particularly effective in attenuating the specific broad range of frequencies customarily encountered in and around aircraft jet engines in various modes of operation of the aircraft. This sound attenuation structure comprises a honeycomb core having a usual multiplicity of endwise directed cells therein, a thin imperforate facing sheet bonded to one side of the honeycomb core, a perforated facing sheet having a multiplicity of perforations having a predetermined size and spacing bonded to the opposing side of the honeycomb core, and a thin sheet of woven metal cloth adhesively bonded to the outer exposed side of the perforated sheet. Typically, the honeycomb core and the imperforate facing sheet and the perforate sheet are made from aluminum alloys commonly used in aircraft applications.

The wire cloth is typically made from an aluminum alloy or from a stainless steel alloy. Such sound suppression panels are exposed to a severe environment where they encounter a high speed grazing air flow and are exposed to a wide range of temperatures. Since commercial jet aircraft are operated throughout the world these sound suppression panels also encounter ground conditions that are also severe and are further exposed to the further difficulties associated with the operation and maintenance of commercial jet aircraft.

The aluminum wire cloth due to the nature of aluminum has tended to deteriorate in use and require replacement in the field. Similarly, the stainless steel cloth, while longer lived than aluminum cloth, also requires replacement in the field since even though the stainless steel wire cloth is isolated from the underlying aluminum perforated sheet by an adhesive bonding medium the opportunity does arise in manufacture and use for a galvanic coupling to occur between the wire cloth and the perforated sheet thereby causing deterioration of the stainless steel wire cloth to aluminum perforate bond interface and to cause partial disbanding from the perforated sheet. The manufacture of such sound suppression panels typically involve the use of adhesives that require curing in autoclaves under elevated pressures and temperatures.

In the field, it has been difficult to achieve a lower cost satisfactory repair including the replacement of such wire cloth media for this type of sound suppression panel since such repair requires elevated temperature cure and vacuum bag processing to provide a repair comparable to original manufacturing conditions using the same materials. Thus, a need has arisen for a satisfactory lower cost method of repairing this type of sound suppression panels on aircraft in the field.

SUMMARY OF THE INVENTION

Briefly stated, the present invention contemplates a method and product for repair in the field of aircraft sound suppression panels that have a honeycomb core which is provided with an imperforate back metal sheet and a perforated facing metal sheet to which is adhesively bonded a porous wire cloth composed of either aluminum or stainless steel. The method includes removing the partially disbonded and deteriorated wire cloth outer layer and by sanding or other methods, removing any remaining vestiges of any corrosion of the metal facing sheet and of the adhesive media used to originally bond the wire cloth to the underlying perforated metal sheet. Any debris from the removal of any facing sheet corrosion, wire cloth, and the adhesive that may be residing in the cells of the honeycomb core is removed as by vacuuming such debris therefrom through the apertures of the perforated sheet. The outer surface of the perforated sheet may then be primed as desired to enhance the bonding thereto of the new microporous media.

In the preferred embodiment of the invention, a thin film or sheet of a suitable polymer such as polyurethane that is coated with a suitable pressure sensitive adhesive and which is provided with a plurality of spaced holes typically having a suitable hole diameter of 0.002 to 0.012 inch with typically a uniform spacing to provide a percent of open area (POA) of around 3–15, as specified to provide appropriate acoustic characteristics, is then pressed into position on the exposed face of the perforate sheet. The microperforated film may be either cut to size prior to application or may trimmed to fit after application according to the needs of the particular application.

These and other objects and advantages of the invention will become better understood by reference to the following detailed description when considered together with the accompanying drawing, in which:

DETAILED DESCRIPTION OF THE PREFERRED EMBODIMENT

Figure 1:
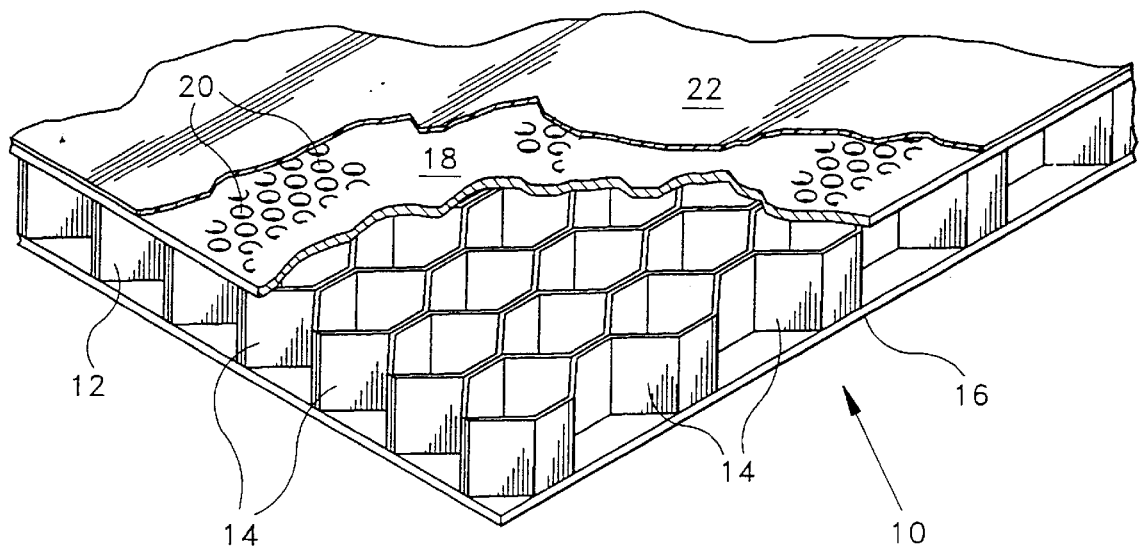
FIG. 1 is a perspective view of the honeycomb noise attenuation structure repaired by the method of the present invention.
Figure 2:
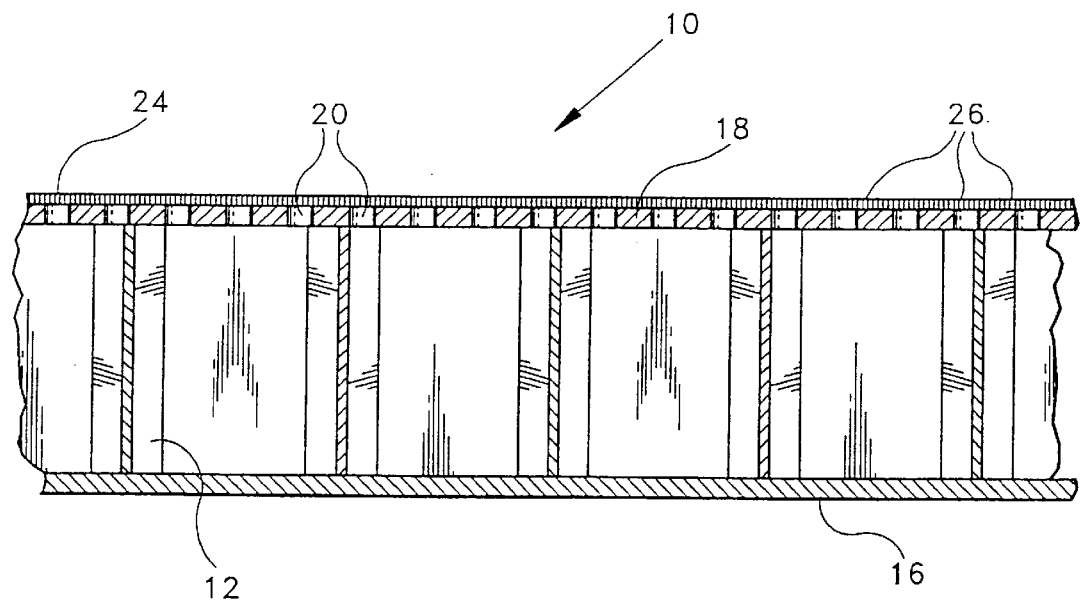
FIG. 2 is an enlarged fragmentary vertical section of the structure of FIG. 1 after such repair has been made.

Referring now to the drawing in detail, the noise attenuation sandwich which is intended to be repaired by the novel method of the present invention is generally designated by the reference character 10. A common version of the structure 10 comprises a single honeycomb core 12 having a usual multiplicity of endwise directed cells 14 therein, a thin imperforate back facing sheet 16 that is adhesively bonded to the faying edges of the honeycomb core 12 by a suitable thermoset adhesive and a thin perforated sheet 18 that is similarly adhesively bonded to the opposing faying edges of the honeycomb core 12. Typically, the perforate sheet 18 is provided with a plurality of round holes of uniform diameter and which are uniformly spaced, although the size and spacing of the holes or perforations 20 may be varied as desired. The perforations 20 are typically in the range of 0.039 to 0.090 inch in diameter with a spacing therebetween to provide POA of around 24 to 36 percent.

A thin sheet of porous wire cloth 22, which is typically an aluminum or stainless steel alloy, is adhesively bonded to the underlying perforated sheet 18 by a suitable thermoset adhesive. The wire cloth is typically woven as, but not limited to, Reverse Plain Dutch weave and provides a microporous media through which the sound from an aircraft engine may flow.

When the aircraft has been sufficiently used under a variety of severe environmental conditions to cause the wire cloth 22 or the perforated sheet or the bond interface of the wire cloth to the perforated sheet to deteriorate sufficiently to require repair of the structure 10 the novel method of the present invention is employed. Initially, the wire cloth 22 is stripped away from the perforated sheet 18 to the extent desired. In some applications of the structure 10, the deterioration is found to occur more frequently in some locations than in others which is generally due to ambient environmental conditions. Also, the wire cloth 22 is removed in a manner to allow the replacement material to be easily installed.

After the wire cloth 22 has been removed to the extent desired and required for an efficacious repair, the outer surface of the perforated sheet 18 has any remaining adhesive adhering to it after removal of the cloth 22 removed by any suitable method such as scraping, sanding as well as in conjunction with chemical processing that might assist in such removal. If desired, the exposed outer surface of the perforated sheet may be treated in any suitable way, such as by priming or the like, to improve the adherence and corrosion protection aspects of the outer surface of the perforated sheet 18. Typically, such surface preparation will include sanding the perforate sheet to the bare metal and then using a suitable acid solution to strip away any corrosion products. The interior of the cells 14 of the core 12 are cleaned in any suitable manner, such as by flushing with a suitable cleaning solution or by vacuuming, to remove any debris that may be contained in the cells 14 by reason of the removal of the adhesive or otherwise. Preferably, a vacuum would be exerted on the cells 14 through the perforations 20 of the sheet 18 to remove such debris.

A suitable conversion solution is then applied to the perforate sheet to form a thin chromate layer on the sheet and then the sheet is suitably primed with a spray type primer to enhance adherence of the polymer sheet.

A thin sheet of polymer film 24 having a precoated pressure sensitive adhesive surface is then applied to the outer surface of the perforate sheet 18. The precoated pressure sensitive adhesive surface of the film 24 is a suitable solvent resistant adhesive, which adhesive is typically an acrylic adhesive, and provides a peel strength of 10 to 20 pounds per inch of width. The thin film 24 is a suitable polymer, such as polyurethane, which is erosion resistant, ultraviolet radiation resistant, and that has the desired formability and drapability attributes. The film 24 is preferably around 0.003 to 0.020 inch thick and is provided with a plurality of small apertures or pores 26 that typically have a diameter of, but not limited to around 0.002 to 0.0012 inch in diameter and which are spaced to provide a POA of around 3–15% as needed to provide appropriate acoustic characteristics. Typically, such pores are spaced apart around 0.013 to 0.025 to provide an airflow resistance of (CGS Rayls) of around 7–20 Rayls at a normalized airflow velocity of 105 cm/sec. at standard temperature and pressure (72° F., 14.7 psi). Such pores 26 are preferably provided by drilling with a laser that precludes any damage to the adhesive and polymer film in the immediate vicinity of the drilled pore. Such microporous film having a pressure sensitive adhesive coated on one surface is available from the Minnesota Mining and Manufacturing Company under the tradename 8681 HS-36251.

The film 24 may then be applied to the exposed outer surface of the perforate sheet 18 by any suitable manner to provide uniform pressure sufficient to permit the bonding of the film 24 to the sheet 18. Such pressure may be exerted by hand, roller or any suitable means. The film 24 may be trimmed to fit after application to the perforate sheet 18 or may be precut to precisely replace the portion of the wire cloth 22 that has been replaced.

In summary, an efficient method has been provided to replace easily the deteriorated or disbanded portion of the wire cloth outer sheet of a sound attenuation structure while still retaining the desired sound attenuation attributes over the desired range of frequencies encountered in aircraft jet engine applications.

Although the foregoing invention has been described in some a detail by way of illustration and example for the purpose of clarity of understanding it should be understood that certain changes and modifications may be practiced within the scope of the invention as limited only by the scope of the appended claims.

What is claimed as new and useful and desired to be secured by United States Letters Patent is:

1. A product for repairing a sound attenuation panel particularly adapted for noise suppression in a housing for an aircraft jet engine, which panel includes a porous woven wire cloth adhesively bonded to a perforated sheet that has deteriorated or partially disbanded from the perforated sheet, comprising:

a thin polymer film having a pressure sensitive adhesive applied to one surface thereof and adapted to be bonded by such adhesive to the perforated sheet as a replacement for the woven wire, the film being provided with a plurality of pores having a diameter of 0.002 to 0.012 inch and a generally uniform spacing to provide a POA of around 3–15% to provide desired acoustic performance.

2. The product of claim 1 wherein the polymer film is around 0.003 to 0.020 inch thick.

3. The product of claim 2 wherein the polymer film is chosen from a class to provide erosion and ultraviolet radiation resistance.

4. The product of claim 3 wherein the polymer film is chosen from a class which permits the product to be exposed to a long-term service temperature in the range of 750–300 degrees F. without distortion.

5. The product of claim 3 wherein the polymer film is polyurethane.

* * * * *